(12) United States Patent
Feltin et al.

(10) Patent No.: US 11,283,679 B2
(45) Date of Patent: *Mar. 22, 2022

(54) DATA-DRIVEN IDENTIFICATION AND SELECTION OF FEATURES RELATED TO A STATE CHANGE OF A NETWORK COMPONENT

(71) Applicant: Cisco Technology, Inc., San Jose, CA (US)

(72) Inventors: Thomas Michel-Ange Feltin, Paris (FR); Wenqin Shao, Versailles (FR); Parisa Foroughi, Paris (FR); Frank Brockners, Cologne (DE)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,384

(22) Filed: Sep. 14, 2020

(65) Prior Publication Data

US 2021/0092009 A1 Mar. 25, 2021

Related U.S. Application Data

(63) Continuation-in-part of application No. 16/789,723, filed on Feb. 13, 2020, now Pat. No. 11,115,280.
(Continued)

(51) Int. Cl.
*H04L 12/24* (2006.01)
*G06N 3/08* (2006.01)
(Continued)

(52) U.S. Cl.
CPC ............ *H04L 41/083* (2013.01); *G06F 17/18* (2013.01); *G06F 17/40* (2013.01); *G06N 3/08* (2013.01); *H04L 41/0836* (2013.01)

(58) Field of Classification Search
CPC ........... G06N 3/08; G06F 17/18; G06F 17/40; H04L 41/083; H04L 41/0836; H04L 41/085; H04L 43/0817
See application file for complete search history.

(56) References Cited

U.S. PATENT DOCUMENTS 6,714,941 B1 * 3/2004 Lerman ................ G06F 16/951
8,774,023 B2 7/2014 Wang et al.
(Continued)

OTHER PUBLICATIONS

V. Jeyakumar et al. ExplainIt!—A Declarative Root-cause Analysis Engine for Time Series Data. In Proceedings of the 2019 International Conference on Management of Data (SIGMOD '19). Association for Computing Machinery, New York, NY, USA, 333-348. (Year: 2019).*
(Continued)

*Primary Examiner* — John M MacIlwinen
(74) *Attorney, Agent, or Firm* — Lee & Hayes, P.C.

(57) ABSTRACT

Techniques and mechanisms for automatically identifying counters/features of a network component that are related to a state change (or event) for the network component or for the network itself. For example, using data obtained from the network component around a time of the state change, delta-averages for the counters/features around the time of the state change may be determined. The delta-averages may be utilized to determine which counters/features are most descriptive for a particular state change. Determining which counters/features are most descriptive may also include determining which counters/features are most relevant, i.e., counters/features that contribute most to preserving the manifold structure of the original data or counters/features with the highest or lowest correlation with the other counters/features in the data set. Thus, the techniques described herein provide for an approach to distill which counters/
(Continued)

features contribute the most to a particular state change from a data driven perspective.

20 Claims, 6 Drawing Sheets

Related U.S. Application Data

(60) Provisional application No. 62/903,331, filed on Sep. 20, 2019.

(51) Int. Cl.
*G06F 17/40* (2006.01)
*G06F 17/18* (2006.01)
*H04L 41/083* (2022.01)
*H04L 41/0823* (2022.01)

(56) References Cited

U.S. PATENT DOCUMENTS

| | | | |
|---|---|---|---|
| 9,942,253 B2 | 4/2018 | Freedman et al. | |
| 2004/0148266 A1 | 7/2004 | Forman | |
| 2012/0069747 A1 | 3/2012 | Wang et al. | |
| 2015/0074035 A1* | 3/2015 | Narasappa | G06N 7/005 706/52 |
| 2015/0082432 A1* | 3/2015 | Eaton | G06F 9/5072 726/23 |
| 2016/0294606 A1* | 10/2016 | Puri | H04L 43/04 |
| 2016/0359872 A1* | 12/2016 | Yadav | H04L 43/0894 |
| 2018/0314726 A1 | 11/2018 | Bath et al. | |
| 2019/0163678 A1 | 5/2019 | Bath et al. | |
| 2019/0215230 A1* | 7/2019 | Mermoud | H04L 41/064 |
| 2020/0053108 A1 | 2/2020 | Cili et al. | |
| 2021/0092010 A1 | 3/2021 | Shao et al. | |

OTHER PUBLICATIONS

M. Zhang et al. Feature selection at the discrete limit. In Proceedings of the Twenty-Eighth AAAI Conference on Artificial Intelligence (AAAI'14). AAAI Press, 1355-1361. (Year: 2014).*
Varma, S. and Das, S. "Deep Learning". Chapter 8. (Year: 2018).*
Norris, "The Requirement for Congruence in Normalization", Int. J. LCA 6, 2001, pp. 85-88.
Office Action for U.S. Appl. No. 16/789,723, dated Dec. 21, 2020, Shao, "Data-Driven Identification of Features Related to a State Change of a Network Component", 13 Pages.
Zhang, "Feature Selection at the Discrete Limit", In Procedings of the Twenty-Eighth AAAI Conference on Artifical Intelligence (AAAI'14). AAAI Press, 2014, pp. 1355-1361.
Valdivieso Caragua, Angel Leonardo, et al., "Monitoring and Discovery for Self-Organized Network Management in Virtualized and Software Defined Networks," Sensors 2017, www.mdpi.com/journal/sensors, published Mar. 31, 2017, pp. 1-31.

* cited by examiner

400

```
┌─────────────────────────────────────────────────────────────────────────┐
│ BASED AT LEAST IN PART ON A STATE CHANGE AT A NETWORKING COMPONENT,     │
│ OBTAIN DATA RELATED TO VALUES OF A PLURALITY OF FEATURES OF THE         │
│ NETWORKING COMPONENT, THE DATA BEING WITHIN A WINDOW DURING WHICH       │
│ THE STATE CHANGE OCCURRED                                               │
│                                  402                                     │
└─────────────────────────────────────────────────────────────────────────┘
                                    │
                                    ▼
┌─────────────────────────────────────────────────────────────────────────┐
│           EVALUATE THE DATA WITH RESPECT TO CHANGES IN THE VALUES        │
│                                  404                                     │
└─────────────────────────────────────────────────────────────────────────┘
                                    │
                                    ▼
┌─────────────────────────────────────────────────────────────────────────┐
│ BASED AT LEAST IN PART ON THE EVALUATING THE DATA, DETERMINE A LIST OF  │
│ THE PLURALITY OF FEATURES HAVING LARGEST CHANGES IN VALUES, WHEREIN     │
│ THE LIST REPRESENTS MOST LIKELY FEATURES CONTRIBUTING TO THE STATE      │
│ CHANGE OF THE NETWORKING COMPONENT                                      │
│                                  406                                     │
└─────────────────────────────────────────────────────────────────────────┘
                                    │
                                    ▼
┌─────────────────────────────────────────────────────────────────────────┐
│                        PROVIDE THE LIST TO A USER                        │
│                                  408                                     │
└─────────────────────────────────────────────────────────────────────────┘
```

```
┌─────────────────────────────────────────────────────────────────────┐
│ BASED AT LEAST IN PART ON A STATE CHANGE AT A NETWORKING COMPONENT, │
│ OBTAIN DATA RELATED TO VALUES OF A PLURALITY OF FEATURES OF THE     │
│ NETWORKING COMPONENT, THE DATA BEING WITHIN A WINDOW DURING WHICH   │
│ THE STATE CHANGE OCCURRED                                           │
│                               502                                    │
└─────────────────────────────────────────────────────────────────────┘
                                  ↓
┌─────────────────────────────────────────────────────────────────────┐
│           EVALUATE THE DATA WITH RESPECT TO CHANGES IN THE VALUES   │
│                               504                                    │
└─────────────────────────────────────────────────────────────────────┘
                                  ↓
┌─────────────────────────────────────────────────────────────────────┐
│ BASED AT LEAST IN PART ON THE EVALUATING THE DATA, DETERMINE A LIST │
│ OF THE PLURALITY OF FEATURES HAVING LARGEST CHANGES IN VALUES,      │
│ WHEREIN THE LIST REPRESENTS FEATURES THAT ARE MOST LIKELY           │
│ CONTRIBUTORS TO THE STATE CHANGE OF THE NETWORKING COMPONENT        │
│                               506                                    │
└─────────────────────────────────────────────────────────────────────┘
                                  ↓
┌─────────────────────────────────────────────────────────────────────┐
│   DETERMINE A SELECTION QUALITY SCORE FOR A SET OF FEATURES WITHIN  │
│   THE LIST                                                           │
│                               508                                    │
└─────────────────────────────────────────────────────────────────────┘
                                  ↓
┌─────────────────────────────────────────────────────────────────────┐
│                  PROVIDE THE SET OF FEATURES TO A USER               │
│                               510                                    │
└─────────────────────────────────────────────────────────────────────┘
```

FIG. 5

DATA-DRIVEN IDENTIFICATION AND SELECTION OF FEATURES RELATED TO A STATE CHANGE OF A NETWORK COMPONENT

PRIORITY CLAIM AND CROSS-REFERENCE TO RELATED APPLICATIONS

This application is a continuation-in-part of, and claims priority under 35 USC § 120 to, U.S. patent application Ser. No. 16/789,723, filed Feb. 13, 2020, which is a non-provisional of, and claims priority under 35 USC § 119(e) to, U.S. Provisional Patent Application No. 62/903,331, filed Sep. 20, 2019, both of which are fully incorporated by reference herein as if fully set forth below.

TECHNICAL FIELD

The present disclosure relates generally to automatically identifying features related to a state change of a network component based on a data driven network event description using delta-averages and selection of identified features that are most relevant to the state change.

BACKGROUND

In computer networking, many network components, e.g., routers, servers, switches, etc., handle large amounts of data signals. For example, a router may route large amounts of data signals throughout the network and/or in and out of the network. Today, many of the routers include well above 100,000 counters or features.

When a state change or event occurs within the router or the network, a set of counters/features may be primarily responsible for the state change or may be most affected by the state change. However, the sheer volume of counters/features of the router makes such determination difficult. Currently, understanding the state of a router generally involves a domain expert (e.g., network engineer) that interprets a selected set of operational data retrieved through simple network management protocol (SNMP), command-line interface (CLI), etc. Currently, such network engineers often choose which operational counters are monitored up front for operational data. This limits monitoring/analysis of a number of counters/features that may react to state changes and thus, makes it difficult to determine which counter/features are related to the state change of the router.

Additionally, the network engineers have no way to assess the quality of the selection of operational counters. In particular, the emergence of model driven telemetry (MDT) allows the automated and frequent retrieval of all the available operational counters on a router, in a semantically consistent way through a collection of YANG modules. Routers in large-scale networks generate hundreds of thousands of individual operational counters, each describing a particular aspect of device behavior. In network telemetry data sets of such dimensionality, distilling the information which best describes an event can be challenging. Events refer to any network or hardware-related events which cause the global state of the router or network to change, e.g., network loops, black holes, interface failures, memory leaks, etc. Because of the dependencies between the different operational counters, the majority of counters are highly impacted in value when events occur in the network. However, among all the thousands of counters changing in value, only a few describe the cause of the event. The majority of counters are either (i) frequently changing in value independently of the event or (ii) only describing the consequences of the actual event. For example, an interface failure may cause packet losses, route re-convergence, TCP connection changes, traffic changes, etc. which constitute the majority of changing counters, while the counters describing the actual root cause, e.g., interface counts, may only be a few instances among the several thousands.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a flow diagram of an example method for automatically identifying counters/features of a network component that are related to a state change (or event) for a network component or for the network itself.

FIG. 5 illustrates a flow diagram of an example method for automatically determining which counter/features identified by the example method of FIG. 4 are most relevant.

DESCRIPTION OF EXAMPLE EMBODIMENTS

Overview

Figure 1:
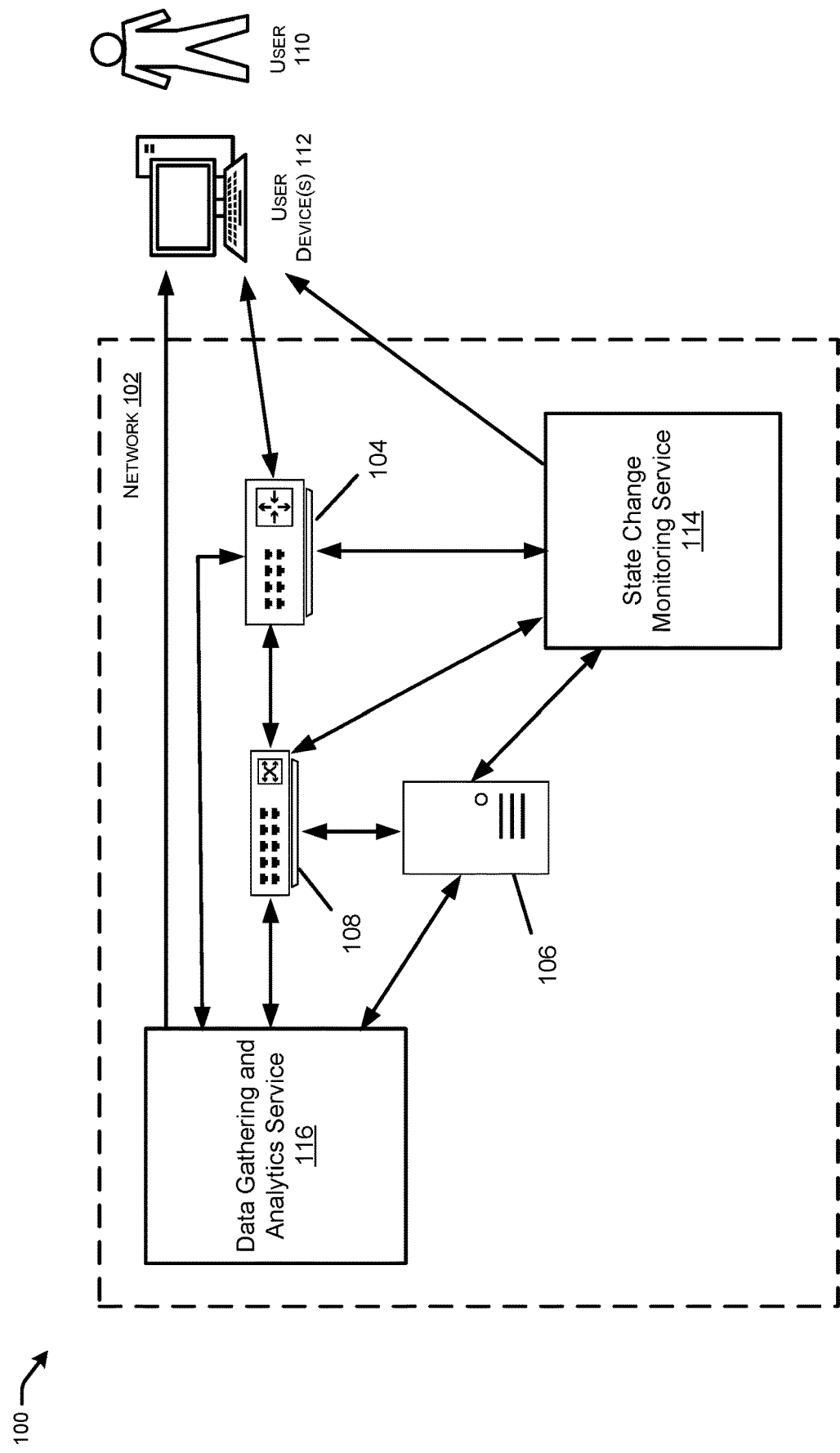
FIG. 1 schematically illustrates an example of a network that includes a state change monitoring service and a data gathering and analytics service.

This disclosure describes techniques for automatically identifying counters/features of a network component that are related to a state change (or event) for the network component or for the network itself. For example, using data obtained from the network component around a time of the state change, delta-averages for the features around the time of the state change may be determined. The delta-averages may then be utilized to determine which counters/features are most descriptive for a particular state change. The counter/features that are the most descriptive for a particular state change is as important as the change detection itself. This is especially true since in a case of an event/state change occurring, a large amount of counters/features may react to the state change or event. Thus, the techniques described herein provide for an approach to distill which counters/features contribute the most to a particular state change from a data driven perspective. Such an approach is inspired by the underlying logic of t-distributed stochastic neighbor embedding (t-SNE) to distill which counters/features contribute the most in a transition of one cluster of data to another cluster of data, e.g., from one state of the network component to another state of the device.

While the reaction of a counter/feature to an event can be quantified from data behavior, the intelligibility of a counter/feature in a data set, i.e., how useful it is in helping a human explain the event, is strictly defined by domain knowledge. Thus, in configurations, a metric to quantify the abstract notion of how intelligible a counter/feature is in the data set, based on the counter's rareness in the feature set (e.g., how many of the same types of counters exist in the entire data set), is defined. This metric is extended into a cross-entropy based metric to describe the overall intelligibility of a selection of counters/features. The method then combines this estimation of intelligibility with a score for how strongly the features react to a change (data behavior) to define an optimization score, e.g., the cross-entropy based metric may approximate/estimate the importance/relevance of a feature that may be perceived by an entity with domain knowledge. The optimization score thus allows the computation of optimal selections to help network engineers explain network events.

In configurations, a method in accordance with techniques described herein may include obtaining, based at least in part on a state change at a networking component, e.g., a router, data related to values of a plurality of features of the networking component. In configurations, the plurality of features may undergo preprocessing before a t-SNE step to distill which counters/features contribute the most in a transition of one cluster of data to another cluster of data, e.g., from one state of the network component to another state of the device. The data is within a primary window of time during which the state change occurred. The data may be evaluated using a delta-average based model, where the delta-average based model evaluates the data within a first window of the primary window and a second window of the primary window. The first window includes first data of the data prior to occurrence of the state change, while the second window includes second data of the data after the occurrence of the state change.

Based at least in part on the evaluation of the data with the delta-average based model, a change in mean values of the values for each feature of the plurality of features may be determined between the first window and the second window. Based at least in part on the change in mean values of the values for each feature of the plurality of features between the first window and the second window, a list of the plurality of features having the largest changes in mean values between the first window and the second window may be determined. The list may be based on a predetermined number of features, e.g., a threshold amount of features with the largest changes in mean values. Furthermore, the list represents the most likely features contributing to the state change of the networking component. The list of features may be provided to a user, e.g., a network engineer. The user may then use the list to determine necessary steps for rectifying the state change, if needed.

In configurations, the method in accordance with techniques described herein may also include determining a selection quality score for a set of features within the list. The selection quality score may be determined by determining a meaningfulness score of the selected features in the list, determining a change score based on how strongly the selected features in the list react to the state change, and multiplying the meaningfulness score by the change score to obtain a result. In configurations, the determining the selection quality score may also include multiplying the result by a regularization score. In configurations, the meaningfulness score represents a rareness of the features in the list. In other configurations, the meaningfulness score alternatively or additionally represents how often a feature is faced with a change. In configurations, an optimization process may be performed with respect to the selection quality score. The set of features within the list of features may be provided to a user, e.g., a network engineer. The user may then use the set of features to determine necessary steps for rectifying the state change, if needed.

Additionally, the techniques described herein may be performed by a system and/or device having non-transitory computer-readable media storing computer-executable instructions that, when executed by one or more processors, performs the method described above.

Example Embodiments

Model driven telemetry (MDT) generally makes gathering of operational data related to counter/features of a network component within a network, e.g., a router, available in a holistic and semantically consistent way through a collection of YANG models. Several mechanisms exist to automatically detect changes of the router state, ranging from simple threshold-based schemes based on a select set of models and corresponding counters/features to more sophisticated, multi-variant schemes as further described in an example herein.

Thus, once a state change has been determined for the router or the network by a state change monitoring service or component of the network, operational data related to counters/features of the router may be gathered by a data gathering and analytical service or component of the network. The router may be part of the network or be external to the network. The data gathering and analytical service may obtain data related to values of a plurality of counters/features of the router. As previously noted, there may be well over 100,000 counters/features of the router. For example, the counters/features (referred to herein as counters) may include traffic related counters, resource related counters (e.g., memory, central processing unit (CPU), ternary content-addressable memory (TCAM), queue, etc.), control plane counters (border gateway protocol (BGP) neighbors, prefix counts, etc.), etc. The operational data may be gathered within a primary window of time during which the state change occurred. The data may then be evaluated in order to model each counter's reaction to the state change as delta-averages, e.g., a change in mean of two smaller windows, e.g., a first window before the state change or event occurred and a second window after the state change or event occurred. In configurations, a predetermined amount of the data within the primary window, may be disregarded. For example, in configurations, a third of the data, e.g., a middle third of the data within the primary window, may be disregarded. As is known, a feature describes a measurable property of an object described in a data set. Thus, the features are the counters in MDT data.

In configurations, once the delta-averages for all counters for the primary window are calculated, the delta-average for each counter may be sorted and ranked in a list that shows the contribution of features to a particular state change or event from a data driven perspective. Top ranking counter that contribute the most to a state change or event from a data driven perspective may then be provided to a user as indicating primary counters that may have contributed to the state change or event.

In configurations, a relative mean may be used to sort the counters and create the list that shows the contribution of counters to a particular state change or event from a data driven perspective. In some situations, what is important is the relative step change for each counter rather than the step itself as used in the previously described technique with respect to delta-averages. To determine the relative step change value for each counter, each step may be normalized by the max value of the two windows of values being considered. The absolute value of the normalized step change value for each counter is the final value for each counter. Based at least in part on the final values, the list that shows the contribution of counters to a particular state change or event from a data driven perspective may be created.

In configurations, variance may be used to sort the counters and create the list that shows the contribution of counters to a particular state change or event from a data driven perspective. Instead of considering the difference of mean values, the difference of the variance values may be considered. Thus, instead of disregarding the one third of the data, the variance for the whole window of size W around the event may be considered. This may provide another view of the changes that are reflected in the counters. Based at least in part on the final values related to variance, the list that shows the contribution of counters to a particular state change or event from a data driven perspective may be created.

In configurations, a spike in the counter values may be used to create the list that shows the contribution of counters to a particular state change or event from a data driven perspective. The intuition behind using a "step" or "spike" roots back to the nature of data in question. As an example, comparing to periodic patterns such as sine and cosine may be useful for communication cases. Therefore, it does not necessarily need to be a spike but rather the shape of the data. When a change occurs, the spike is supposed to happen in the transition time of the counter. This means the windowing generally must be different compared to the other techniques described herein. While the step/delta-averages technique previously mentioned uses a window of size W points, divides it into three parts, and disregards one third, for the spike calculation, all three parts of data are used for the spike technique.

In configurations, a distance to reference data behavior technique may be used to create the list that shows the contribution of counters to a particular state change or event from a data driven perspective may be created. With such a technique, reference shapes are defined. e.g., the shape of a perfect step or spike. For example, a half window of 0 with a half window of 1 (or the other way around) for a step and just a 0 right in the middle of all ones (or vice versa) for a spike may be defined. A norm2 distance of the references from the window around the event may be calculated, e.g., the squared 2-norm of all the distances around the event may be calculated. For each counter, the minimum of the resulting values from the distance to references may be used to create the list.

In configurations, more than one type of change may be considered in the assessment to create the list that shows the contribution of counters to a particular state change or event from a data driven perspective. Thus, the maximum of two or more of the various measuring techniques described herein may be considered, e.g., the step technique, the relative mean technique, the variance technique, the spike technique, and/or the distance to reference technique. The choice of which technique to use is dependent on the type of data being used. Also, use cases for the data may influence the choice of which technique to use.

In configurations, the ranked list may be interpreted further by the state change monitoring service. For example, in order to approach the root cause of a state change or event, certain counter/features may be excluded from the ranked list. For example, traffic related counters may be excluded from the list. This is due to the fact that traffic related counters often react to changes of a router state. Thus, a pure change in traffic statistics does not lend to general conclusions from a networking engineering or troubleshooting perspective.

In configurations, the state change or event for the router may be determined by the state change monitoring service using a t-distributed stochastic neighbor embedding (t-SNE) that analyzes data related to values of the plurality of counters/features of the router. The data may be data obtained in a real time fashion or may be historical data gathered by the data gathering and analytical service prior to the occurrence of the state change or event. Another example of a technique that may be utilized by the state change monitoring service of the network includes a uniform manifold approximation and projection (UMAP) technique.

Furthermore, in configurations the ranked list may be evaluated by the state change monitoring service to determine which counter/features in the ranked list are most relevant, i.e., counters/features that contribute most to preserving the manifold structure of the original data or counters/features with the highest or lowest correlation with the other counters/features in the data set, e.g., the ranked list of counters/features. Thus, in configurations, a measure may be used to describe the quality of counters/features in the ranked list, i.e. how well an identified set of counter/features describes the event/change.

In configurations, the selection quality score combines a score for how "meaningful" a selection of features is in a data set, with a score for how strongly the features react to a change. The "meaningfulness" of a selection may be defined in different ways. In telemetry data sets, the most important counters are usually the ones that appear less (e.g. bidirectional forwarding detection (BFD) session counts are more meaningful to a network engineer than one of the many bytes received counters). Based on this assessment, it may be assumed that rare counters in a data set are more meaningful when selected than the most frequent ones. If the selection returns a counter that describes the same thing as 99% of the counters of the data set, a network engineer will have more trouble making sense of it than if it was one of the 1%. Thus, meaningfulness may either be defined as (i) how often a counter is faced with a change, or (ii) how many of the same types of counters exist in the entire data set. In configurations, the second option is used and defines meaningfulness with regards to the existence of substrings or tokens in the description/name of the feature/counter. In the case of model driven telemetry (MDT), the description/name of the feature/counter is the sensor path.

The selection quality score allows one to describe the problem of choosing a set of counters/features that describe an event/change as an optimization problem by finding the counters/features that are both highly changing and highly meaningful to a network engineer. As such, the selection quality score allows one to arrive at an optimal or near-optimal selection, with highest density with regards to information-theoretic metrics. As will be described further herein, the selection quality score combines a score for the specificity of a selection, a change score for how strongly a feature reacts to a state change, and a regularization term to penalize very small selections.

Thus, as can be seen, the counters/features of a network component may be analyzed upon detection of a state change of the network component or the network itself. The analysis may be automatically performed with respect to all counters/features of the network component to determine which counters/features were most likely the cause of the state change or event or were most affected by the state change or event. The analysis may be performed without intervention by a network engineer and without limiting the number of counters/features that are monitored and/or analyzed.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates example 100 of a network 102. The network 102 includes network components including, for example, one or more routers 104, one or more servers 106, and one or more switches 108. Other networking components may be included within or external to the network 102.

As may be seen, a user 110 utilizing a user device 112 may access the network 102. The user may be an individual or an entity, e.g., a business, a school, a charity, other type of organization, etc. The user device 112 may access the network 102 through the router 104. While the router 104 is illustrated as part of the network 102, in configurations, the router 104 may be external to the network 102. Generally, numerous user devices 112 may be accessing the network 112 at a given time. Thus, numerous user devices 112 may be accessing the router 104 at any given time. The numerous user devices 112 may all be part of the same user 110 or may be from different users. The user device 112 may be, for example, and without limitation, any one of a computer, a peripheral device such as, for example, a printer, a facsimile machine, etc., a mobile electronic device such as, for example, a smart phone, a laptop computer, a tablet, a notebook, etc.

A state change monitoring service 114 may monitor the router 104, server 106 and switch 108, as well as other network components of the network not illustrated (e.g., other routers, servers, switches, etc.), for state changes or events. When a state change or event occurs at one of the network components, e.g., router 104, the state change monitoring service 114 may detect the event. The event may be detected by the state change monitoring service 114 based upon real time data gathered by a data gathering and analytics service 116 of the network 102, or by the state change monitoring service 114 itself, from the router 104. In configurations, the state change monitoring service 114 and the data gathering and analytics service 116 may be a single service. In some configurations, the state change monitoring service 114 may detect the state change or event based upon historical data gathered by the data gathering and analytics service 116, or by the state change monitoring service 114 itself, from the router 104. While in this example a state change or event is detected in the router 104, the state change or event may be detected in the server 106, the switch 108, as well as other network components of the network 102 not illustrated.

Once the state change or event has been detected, for example, with respect to router 104, by the state change monitoring service 114, the data gathering and analytics service 116 may gather data during a window of time that includes the time at which the state change or event occurred. The data gathering and analytics service 116 may then analyze the data to determine delta-averages for each counter/feature of the plurality of features for the router 104. The delta-averages may be calculated with respect to a first, smaller window of the window of time, where the first window represents operational data for the counters/features of the router 104 prior to the occurrence of the state change or event, and a second window, smaller window of the window of time, where the second window includes operational data for the counters/features of the router 104 after the occurrence of the state change or event. The delta-averages may represent changes in mean values for each counter/feature of the router 104 between the first window and the second window.

In particular, the delta-averages approach takes advantage of the fact that the changes in the counters/features of the router 104 often present themselves as a change in the mean of the values. Thus, if a window w of points around the event is taken, each counter/feature's reaction to change may be modelled as a change in mean of two smaller windows before and after the event. For example, it is assumed a state change or event occurs at time t corresponding to the relative point in observations in a data-set as $p_e$. The value of each feature i is noted as $v_k^i$ at point k within window w. The difference of average ("delta-average") for each counter/feature may be calculated with equation 1 as follows:

$$\forall f^i, \delta^i = \sum_{k=p_e-w/2}^{k=p_e-w/6} v_k^i - \sum_{j=p_e+w/6}^{j=p_e+w/2} v_j^j \quad \text{Equation 1}$$

In configurations, some of the values may be eliminated from an upper end and a lower end of the window w based on predetermined criteria. For example, in Equation 1, ⅙ of the values at each end of the window w are eliminated. A reason for excluding w/6 points on either side of the state change or event is to eliminate a possible impact of the transition of the values itself. An amount of values other than ⅙ may be eliminated depending on user preference or configurations.

Calculating and subsequently sorting the delta-averages for all counters/features for a given time t at which a state change or event was detected results in a ranked list of counters/features that shows the contribution of counters/features to a particular change from a data driven perspective. Top ranking features are deemed to have contributed the most to the state change or event from a data driven perspective. In configurations, the ranked list may be interpreted further. For example, in order to approach the root cause of a state change or event, certain counter/features may be excluded from the list. For example, traffic related counters may be excluded from the list. This is due to the fact that traffic related counters often react to changes of a router state. Thus, a pure change in traffic statistics does not lend to general conclusions from a networking engineering or troubleshooting perspective. While equation 1 has been provided as an example of calculating delta-averages, e.g., mean changes in values, other techniques and/or equations may be used depending on user preference and/or configurations.

In configurations, a relative mean may be used to sort the counters/features and create the list that shows the contribution of counters/features to a particular state change or event from a data driven perspective. In some situations, what is important is the relative step change for each counter/feature value rather than the step itself. To determine the relative step change value for each counter/feature, each step may be normalized by the maximum value of the two windows of values being considered in the primary window w. The absolute value of the normalized step change value for each counter/feature is the final value for each counter/feature. Based at least in part on the final values, the list that shows the contribution of counters/features to a particular state change or event from a data driven perspective may be created.

In configurations, variance may be used to sort the counters/features and create the list that shows the contribution of counters/features to a particular state change or event from a data driven perspective. Instead of considering the difference of mean values, the difference of the variance values may be considered. Thus, instead of disregarding one third of the data, the variance for the whole window of size w around the event may be considered. Assuming the variance of the window w taken around the event is indicated by at, this may provide another view of the changes that are reflected in the counters.

$$\forall f \delta^i = \partial^i \qquad \text{Equation 2}$$

Based at least in part on the final values related to variance, the list that shows the contribution of counters/features to a particular state change or event from a data driven perspective may be created.

In configurations, a spike in the counter/feature values may be used to create the list that shows the contribution of counters/features to a particular state change or event from a data driven perspective. The intuition behind using a "step" or "spike" roots back to the nature of data in question. As an example, comparing to periodic patterns such as sine and cosine may be useful for communication cases. Therefore, it does not necessarily need to be a spike but rather the shape of the data. When a change occurs, the spike is supposed to happen in the transition time of the counter/feature. This means the windowing generally must be different compared to the other techniques described herein. While the step/delta-averages technique previously mentioned uses a window of size w points, divides it into three parts, and disregards one third, for the spike calculation, for the spike calculation, all three parts of data are used for the spike technique. In particular, if for a counter/feature i, the mean of the first and third parts of data are respectively $m_1^i, m_3^i$ and the min and max of the middle third is indicated by $l_2^i$ and $h_2^i$ the spike value may be calculated as follows:

$$\forall f \delta^i = |\max(l_2^i \times l_2^i - m_1^i \times m_3^i, h_2^i \times h_2^i - m_1^i \times m_3^i)| \qquad \text{Equation 3}$$

In configurations, a distance to reference data behavior technique may be used to create the list that shows the contribution of counters/features to a particular state change or event from a data driven perspective may be created. With such a technique, reference shapes are defined. e.g., the shape of a perfect step or spike for counter/feature values. For example, a half window of 0 with a half window of 1 (or the other way around) for a step and just a 0 right in the middle of all ones (or vice versa) for a spike may be defined. A norm2 distance of the references from the window around the event may be calculated, e.g., the squared 2-norm of all the distances around the event may be calculated. For each counter/feature, the minimum of the resulting values from the distance to references may be used to create the list that shows the contribution of counters/features to a particular state change or event from a data driven perspective may be created.

In configurations, more than one type of change may be considered in the assessment to create the list that shows the contribution of counters/features to a particular state change or event from a data driven perspective. Thus, the maximum of two or more of the various measuring techniques described herein may be considered, e.g., the step technique, the relative mean technique, the variance technique, the spike technique, and/or the distance to reference technique. For example, the maximum of the spike technique and the step technique may be used to create the list that shows the contribution of counters/features to a particular state change or event from a data driven perspective.

$$\forall f \delta^i = \max(\delta_{spike}^i, \delta_{step}^i) \qquad \text{Equation 4}$$

The choice of which technique to use is dependent on the type of data being used. Also, use cases for the data may influence the choice of which technique to use.

Figure 2:
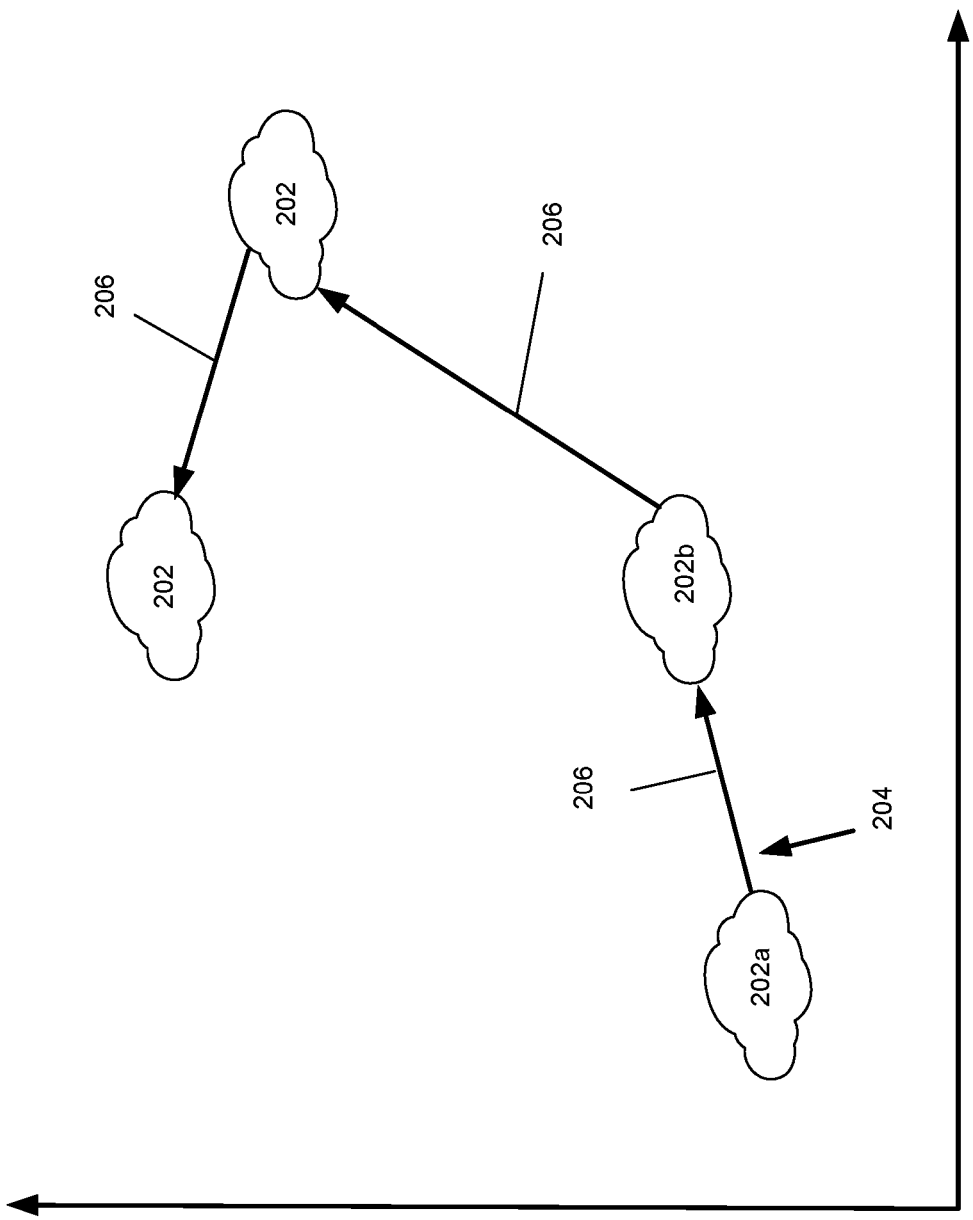
FIG. 2 schematically illustrates an example of analyzing gathered operational data of the various counters/features of a network component of FIG. 1 in order to detect the occurrence of a state change or event.

FIG. 2 illustrates an example 200 of analyzing gathered operational data of the various counters/features of a network component, e.g., router 104, in order to detect the occurrence of a state change or event. In the example of FIG. 2, the operational data is visualized as clusters using the T-SNE technique. Other techniques may be used to visualize the operational data, for example the UMAP technique.

The clusters 202 within FIG. 2 represent operational data for the various counters/features at a particular time. As the clusters 202 "move" in FIG. 2 with respect to time, the movement of the clusters 202 represents a state change or event has occurred with respect to the router 104. For example, by moving from cluster 202a to cluster 202b, a state change has occurred at 204 to cause the move from cluster 202a of operational data to cluster 202b of operational data. Thus, operational data may be analyzed around a window of time at 204 to determine delta-averages as previously described for counters/features between 202a and 202b to determine a list of counters/features that are most related to the state change that occurred between 202a and 202b.

As previously noted, FIG. 2 illustrates a t-SNE visualization of a sample data-set. The data-set reveals a set of clusters 202. Only "major changes," e.g., clusters 202 of operational data, seem to make the router 104's status, as represented by the lines 206, move to an entirely new position.

Figure 3:
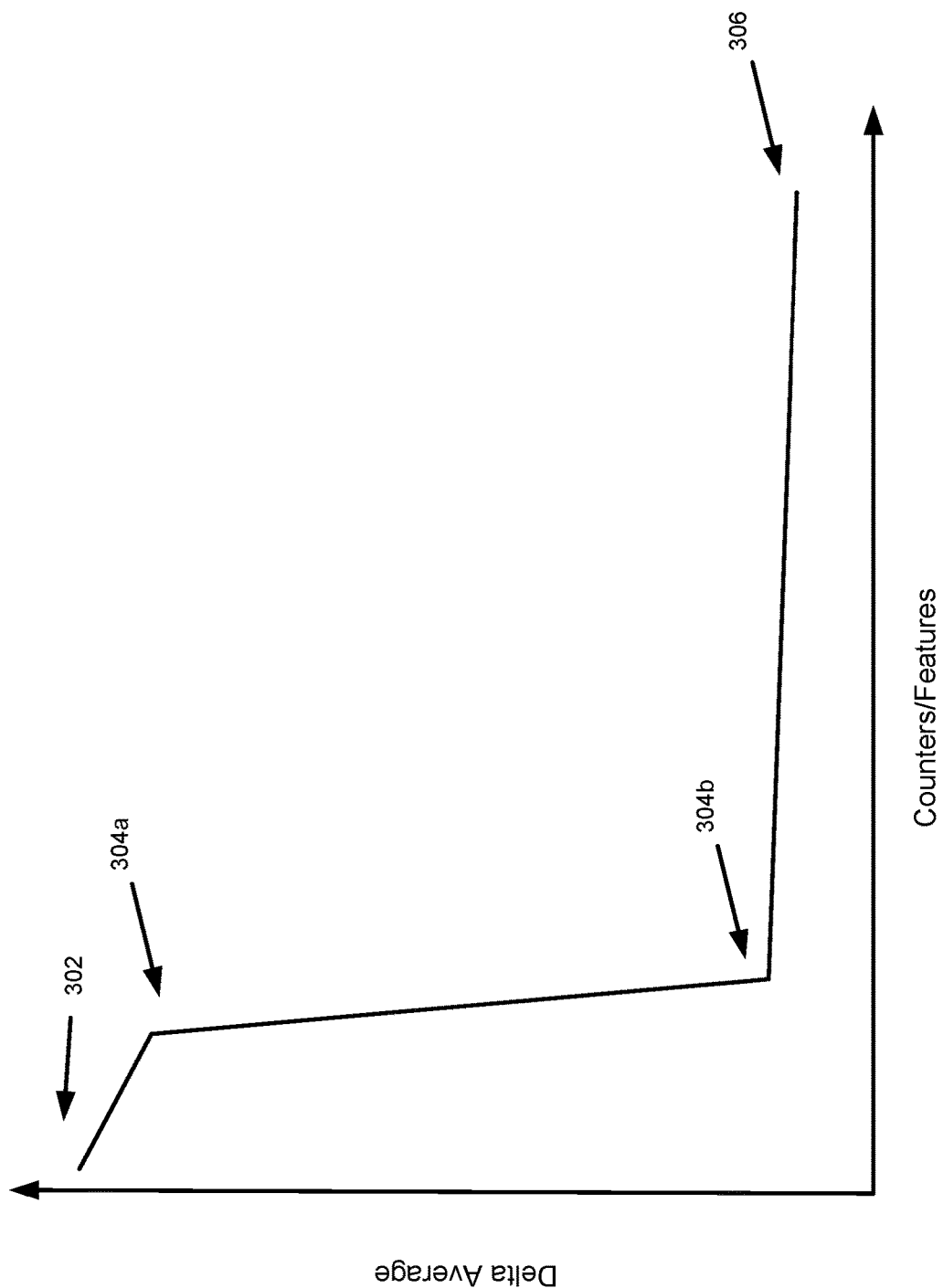
FIG. 3 graphically illustrates results of applying the delta-averages approach and sorting/graphing the counters/features corresponding to their largest delta-averages.

Referring to FIG. 3, applying the delta-averages approach described with respect to Equation 1 and sorting/graphing the counters/features corresponding to their largest delta-averages is shown. The results are for the example with respect to the transition from clusters 202a and 202b. As can be seen in FIG. 3, the counters/features between 302 and 304a have the largest delta-averages and thus, are the biggest contributors to the state change or event between clusters 202a and 202b based on their large delta-averages. As can be seen in FIG. 3, after the large drop-off in delta-averages from 304a to 304b, from 304b to 306 the delta-averages are relative stable, e.g., the same. Thus, in configurations, heuristics may be used to determine which of the counters/features have the largest delta-averages and thus, are the biggest contributors to a state change or event based on their large delta-averages.

In configurations, a threshold of the maximum number of counters/features may be predetermined, e.g., by the user 110. In such configurations, the counters/features with the highest delta-averages may be selected as the biggest contributors to the state change or event until the threshold is reached. For example, the top 50 counters/features may be selected and ranked in a list based on the delta-averages.

In configurations, the ranked list may be evaluated by the state change monitoring service 114 to determine which counter/features in the ranked list are most relevant, i.e., counters/features that contribute most to preserving the manifold structure of the original data or counters/features with the highest or lowest correlation with the other counters/features in the data set, e.g., the ranked list of counters/features. In configurations, the list of counter/features The problem space of event description introduces a new constraint on selected subsets of the gathered data representing the most relevant counters/features since the selected subsets must (i) describe an event and (ii) be intelligible enough for a human to interpret. In this problem space, relevant counters/features are not only those relevant with respect to the information contained, but also those most affected by the change and those with most significance to a network engineer. Thus, a selection of most relevant counters/features should be as intelligible as possible for understanding an event. The ideal selection in this problem space is one that distills the counters/features that are both impacted by the event and meaningful to a network engineer.

In configurations, an approximation of intelligibility, inspired by the computation of term frequency-inverse document frequency (tf-idf), may be used. This estimation is based on the observed correlation between the occurrence of counters/features in a data set and their meaningfulness to a network engineer. Rare features in a data set, i.e., in cases where few counters/features describe a given property, are observed to be more meaningful when selected than the most frequent ones. For example, bidirectional forwarding detection (BFD) session counts (2 occurrences out of 6622 in the data set) may be more meaningful to a network engineer than one of the many bytes sent counters on the router's interfaces (570 occurrences). Rareness is defined as how many of the same types of counters/features exist in the entire data set. This approximation allows the method to leverage the contextual information derived from the counter/feature names and offers a complementary analysis to what may be extracted from the data behavior. To quantify rareness, frequencies may be defined on a space describing the whole set of counter/feature names, where a rare counter/feature name has a low frequency value and a highly occurring counter/feature name has a higher frequency value.

In configurations, the definition of frequencies may be the rareness of counter/feature names in a data set, i.e., frequently occurring counter/feature names should have a higher frequency value than lower occurring counter/feature names. Any method for generating frequencies with such properties is valid. An example method uses descriptive feature names to quantify the rareness of a counter/feature to simply consider their occurrences in the data set.

As previously noted, in configurations, meaningfulness may be defined with regards to the existence of substrings or tokens in the description/name of the feature/counter. In the case of model driven telemetry (MDT), the description/name of the feature/counter is the sensor path. In the case of model driven telemetry (MDT), the description/name of the feature/counter is the sensor path. In the case of MDT, the counter/feature names are the sensor paths. With YANG, the counter/feature names are part of a 3-layered hierarchical name space and a specific name is a branch in that tree. Sensor paths may be parsed to extract three components: a module name, a key value array and a leaf name and the rareness of a counter/feature name is defined as the frequency of these individual components. These three components may be labelled as tokens, with each token being an instance within a token type. In an example, sensor paths consist of three token types, and may be parsed into three tokens: "tcp node statistics" is a token within the first token type of module names, "interface 1" is a token within the second token type of key value arrays, and "bytes-sent" is a token within the third token type of leaf names.

More generally, feature names may be parsed when their format is consistent in order to make token types correspond to precise attributes. This distinction between module name, key value array, and leaf name, may be generalized to the distinction of K token types as the different attributes parsed in a feature name (in this case, K=3). Within each token type, the rareness of a counter/feature name is defined as the frequencies of its tokens within their token type in the set (giving K frequency values for a single feature name).

For a token type $0<k\leq K$, $T_k$ is the total number of unique tokens found among token type k in the entire set of feature names. For $0<i\leq T_k$, $t_{k,i}$ the i-th individual token among the tokens of type k, and $n_{k,i}$ is the number of times token $t_{k,i}$ appears as the k-th token type in a feature name. In other words, this value is counting the occurrences of every unique token among the tokens of the same type. Finally, for $0<k\leq K$ the frequencies $\{p_{k,i}\}0<i\leq T_k$ are defined as $p_{k,i}=n_{k,i}/N$, where N is the total number of features in the set.

For example, the frequency associated with the module name tcp_node_statistics (token type 1), the key value array interface_1 (token type 2), or the leaf name bytes-sent (token type 3), will be the number of times the token appears divided by the total number of features in the data set, giving one probability distribution $p_k$ for each token type (3 in this case). For each token type k, $p_{k,i}$ is a measure for how rare token $t_{k,i}$ is, within the token type k, and estimates how meaningful $t_{k,i}$ is to a network engineer (low values of $p_{k,i}$ translate to the token $t_{k,i}$ being most meaningful).

In configurations, $0<k\leq K$, $q_k=\{q_{k,i}\}$ $1\leq I\leq T_k$ refers to the distributions of tokens defined in the full set of counter/feature names and $p_k=\{p_{k,i}\}0<i\leq T_k$ refers to the distribution of tokens in the data subset selected by a feature selection method. Measuring the quality of a feature selection implies defining a goal metric for a selection. As previously noted, an objective is to produce selections that are both intelligible and impacted by the event. The use of entropy as a goal metric translates to a balanced cluster structure in the data. In configurations, an ideal selection is one that is specific, i.e., an unbalanced cluster structure. The more specific to a given functionality, or to a given element of hardware, the more information a selection may provide to a network engineer and the lower the entropy value. On the contrary, if the selection is very diverse and contains features describing many different functionalities, the entropy will be high. In other words, if the entropy is low, the selection will be more intelligible because it will be focused on a specific functionality. Optimal selections in this problem space are of low entropy.

Entropy does not capture that the selected counters/features are focused on a functionality that is rare in the original data set, e.g., the ranked list. The selected counter/features will have the same score as if the feature selection method was focused on a more frequent functionality. Thus, the score for the feature selection method should be greater if the selection focuses on the rarest features in the data set. In that respect, cross-entropy, i.e., the relative entropy of a distribution compared to a reference, quantifies how focused/specific a selection is along with how much it differs from the reference data set. Cross-entropy captures how specific the information is in the selection, with the original distribution as a reference distribution. Thus, the quality of a selection is measured using cross-entropy, i.e., how much information is contained in the selection with regards to the reference distribution. Therefore, the initial entropy of the original data set, e.g., the ranked list, is subtracted from the data subset selected by the feature selection method to obtain the "gain in information" compared to the full data set:

$$H(p,q)-H(q)=\Sigma_{i,P} p_i \log q_i + \Sigma_{i,Q} q_i \log q_i \quad \text{Equation 5}$$

Cross-entropy is actually very close to a divergence metric between two distributions. However, compared to, for example, the Kullback-Leibler (KL) divergence (DO, the cross-entropy also indicates the specificity of the selection. Actually, if the above score is developed, it can be seen that the score is also the sum of the KL-divergence and the delta in entropy between the two distributions, i.e., the information gain G. Thus, the score S may be given as:

$$S=H(p,q)-H(q)=D_{KL}(p\|q)+H(p)-H(q)=D_{KL}(p\|q)+G \quad \text{Equation 6}$$

Not only does the score S give the distance from the original distribution (divergence), the score S also gives an indication on how concentrated the information is compared to the original score (specificity), and most importantly, this measure is independent of the size of the selection of counters/features.

In configurations, a multivariate time-series of dimension N>0 and a probability distribution q, as is defined above on the counter/feature names only, is considered. At a given timestamp, a change score $\sigma_i$ needs to be defined for each counter/feature (each univariate time-series) that quantifies the amount of change. A simple example of that score may be the difference in baseline on small windows before and after the timestamp of the event (measuring the amplitude of stepwise changes in the time-series), as previously described. The goal is to find a subset of features of size 0<S<N such that the subset describes best what is changing at the given timestamp. This may be expressed as an optimization goal that tries to select counters/features with a high change score, thereby forming a data subset of high cross-entropy, by maximizing the product of the two metrics. The idea behind such an optimization process is that optimal selections may both picture the change around a timestamp, thanks to the change score, and diverge from the original feature set with high specificity, thanks to the cross-entropy. The optimization goal that is attempting to be maximized may be defined as the simple product between cross-entropy of the selection of counters/features with regards to the original data set, and the average change score (the average is used such that both values are independent of the size of the data set). This results in:

$$L'(S,p,q)=H(p,q)1/|S|\Sigma_{i=0,|S|}\sigma_i \quad \text{Equation 7}$$

When used on sample data sets, it turns out that the optimal solution for L' is almost always a single counter/feature only. The chosen counter/feature is one which is quite rare in the original data set and has a high change score around the given timestamp. To relax the constraint and have the counter/feature selection method offer small, but configurable numbers of counters/features that describe the event, in configurations a regularization term $(1-e^{-|S|\alpha})$ is introduced to Equation 7 to penalize the very small selections, which arrives at the final definition of the method L for selecting a data subset of counters/features from the original data set of counters/features, e.g., the ranked list to provide equation 8 below:

$$L(S,p,q)=(1-e^{-|S|\alpha})*H(p,q)*1/|S|\Sigma_{i=0,|S|}\sigma_i \quad \text{Equation 8}$$

The parameter alpha a defines how much the smaller subsets are penalized. As a result, a higher alpha leads to bigger selections of counters/features, i.e., alpha a acts as a tuning parameter for the verbosity of the selection. The selection quality score L combines a score for the specificity of a selection (H(p,q)), a change score for how strongly a counter/feature reacts to a state change $(1/|S| \Sigma_{i=0,T} \sigma_i)$ and a regularization term $(1-e^{-|S|\alpha})$ to penalize very small counter/feature selections. Thus, Equation 8 provides a selection quality score, or meaningfulness score, of selected features that is reflected in a token distributional change before and after selection of the selected features.

The techniques described herein output human-readable counter/feature selections based only on (i) how counters/features behave around a given timestamp and (ii) their sensor path, with configurable verbosity (using alpha), in a fully unsupervised way. As an example, using alpha equal to 1.0, 6 counters/features may be selected from the original data set, e.g., the ranked list, as representing the most meaningful counters/features, while using alpha equal to 0.5, only 3 counters/features may be selected as representing the most meaningful counters/features. In other examples, the changing of alpha may not result in linear results, e.g., doubling alpha may not necessarily result in moving from 3 selections (alpha=0.5) to 6 selections (alpha=1.0).

In configurations, an optimization process may be performed. The process is initialized by selecting a random set of counters/features. At every iteration of the optimization process, the impact of the addition/removal of each counter/feature in the selected set is computed. Only those additions/removals that improve the selection quality score L are maintained/removed from the set. This optimization process is repeated until no further additions/removals improve the score. At the end of the optimization process, the selected features are ordered by their contribution to the score (computed by leave-one-out) in order to have the most important features first. Other techniques may be used for the optimization process. For example, heuristic models may be used.

The selection quality score L thus combines a score for how "meaningful" a selection of counters/features is in a data set, with a score for how strongly the features react to a change. The selection quality score L allows one to describe the problem of choosing a set of counters/features that describe an event/change as an optimization problem by finding the counters/features that are both highly changing and highly meaningful to a network engineer. As such, the selection quality score L allows one to arrive at an optimal or near-optimal selection with highest density with regards to information-theoretic metrics.

While the techniques have been described here using rareness (e.g., how many of the same types of counters exist in the entire data set) as an example of indicating a counter/feature's meaningfulness, other types of distributions may be used. For example, how often a counter/feature is seen, e.g., how often a counter is faced with a change, may be used.

FIGS. 4 and 5 illustrate flow diagrams of example methods 400 and 500, respectively, that illustrate aspects of the functions performed at least partly by the state change monitoring service 114 and data gathering and analytics service 116 as described in FIGS. 1-3. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, Application-Specific Integrated Circuit (ASIC), and any combination thereof. It should also be appreciated that more or fewer operations might be performed than shown in FIGS. 4 and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method 400 for automatically identifying counters/features of a network component, e.g., router 104, that are related to a state change (or event) for the network component or for the network itself. In some examples, the techniques of method 400 may be performed by a data gathering and analytics service, e.g., data gathering and analytics service 116. In such examples, the data gathering and analytics service may comprise one or more hardware interfaces configured to send and receive packets of data in the network, one or more processors, and one or more non-transitory computer-readable media storing computer-executable instructions that, when executed by the one or more processors, cause the one or more processors to perform steps of method 400.

At 402, based at least in part on a state change at a networking component, data is obtained related to values of a plurality of features of the networking component, the data being within a window during which the state change occurred.

At 404, the data is evaluated with respect to changes in the values.

At 406, based at least in part on the evaluating the data, a list of the plurality of features having largest changes in values is determined, wherein the list represents most likely features contributing to the state change of the networking component.

At 408, the list may be provided to a user, e.g., the user 110. The list may be used to rectify the state change of the network component, if necessary.

FIG. 5 illustrates a flow diagram of an example method 500 for automatically determining which counter/features identified by the example method 400 of FIG. 4 are most relevant, i.e., counters/features that contribute most to preserving the manifold structure of the original data or counters/features with the highest or lowest correlation with the other counters/features in the data set, e.g., the ranked list of counters/features. In some examples, the techniques of method 500 may be performed by a data gathering and analytics service, e.g., data gathering and analytics service 116. In such examples, the data gathering and analytics service may comprise one or more hardware interfaces configured to send and receive packets of data in the network, one or more processors, and one or more non-transitory computer-readable media storing computer-executable instructions that, when executed by the one or more processors, cause the one or more processors to perform steps of method 500.

At 502, based at least in part on a state change at a networking component, data is obtained related to values of a plurality of features of the networking component, the data being within a window during which the state change occurred.

At 504, the data is evaluated with respect to changes in the value.

At 506, based at least in part on the evaluating the data, a list of the plurality of features having largest changes in values is determined, wherein the list represents features that are most likely contributors to the state change of the networking component.

At 508, a selection quality score for a set of features within the list is determined.

At 510, the set of features may be provided to a user, e.g., the user 110. The set of features may be used to rectify the state change of the network component, if necessary.

Figure 6:
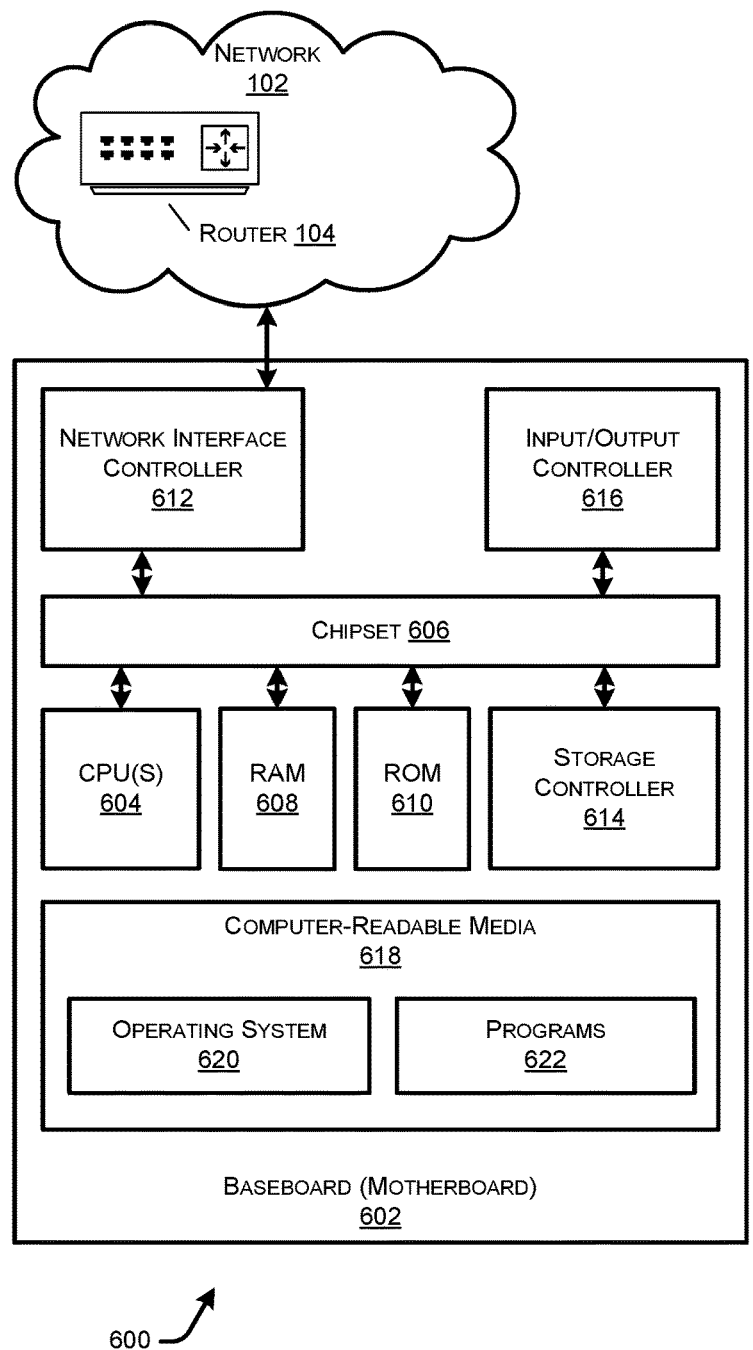
FIG. 6 is a computer architecture diagram showing an illustrative computer hardware architecture for implementing a state change monitoring service and a data gathering and/or analytics service that can be utilized to implement aspects of the various technologies presented herein.

FIG. 6 shows an example computer architecture for a computer 600 capable of executing program components for implementing the functionality described above. The computer architecture shown in FIG. 6 may be used to implement the data gathering and analytics service 116 and/or the state change monitoring service 114 for the router 104 in the network 102 described herein, and may comprise a conventional server computer, workstation, desktop computer, laptop, tablet, network appliance, e-reader, smartphone, or other computing device, and can be utilized to execute any of the software components presented herein. In some examples, however, the computer 600 may correspond to networked devices such as servers, switches, routers, hubs, bridges, gateways, modems, repeaters, access points, etc., and can be utilized to execute any of the software components presented herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 102. The chipset 606 can include functionality for providing network connectivity through a NIC 612, such as a gigabit Ethernet adapter. The NIC 612 is capable of connecting the computer 600 to other computing devices over the network 102. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the network 102, and or any components included therein, may be supported by one or more devices similar to computer 600. Stated otherwise, some or all of the operations performed by the network 102, and or any components included therein, may be performed by one or more computer devices 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

The programs 622 may comprise any type of programs or processes to perform the techniques described in this disclosure for automatically identifying counters/features of a network component, e.g., router 104, that are related to a state change (or event) for the network component or for the network 104 itself. Generally, the programs 622 may comprise one or more modules or components to perform any of the operations described herein by any of the different types of devices/nodes described herein. In some instances, the programs may run inside of virtual machines, containers, and/or other virtual resources types.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
based at least in part on a state change at a networking component, obtaining data related to values of a plurality of features of the networking component, the data being within a primary window during which the state change occurred;
evaluating the data with respect to changes in the values, wherein evaluating the data comprises:
evaluating the data using a delta-average based model, the delta-average based model evaluating the data within (i) a first window of the primary window, the first window including first data of the data prior to occurrence of the state change and (ii) a second window of the primary window, the second window including second data of the data after the occurrence of the state change; and
based at least in part on the evaluating the data with the delta-average based model, determining a change in mean values of the values for each feature of the plurality of features between the first window and the second window;
based at least in part on the evaluating the data, determining a list of the plurality of features having largest changes in values, wherein the list represents selected features that are most likely contributors to the state change of the networking component;
determining a selection quality score for a set of features within the list, wherein determining the list of the plurality of features having largest changes in values comprises based at least in part on the determining the change in mean values of the values for each feature of the plurality of features between the first window and the second window, determining the list of the plurality of features having largest changes in mean values between the first window and the second window; and
providing the set of features to a user.

2. The computer-implemented method of claim 1, wherein determining the selection quality score comprises:
determining a meaningfulness score of the selected features in the list;
determining a change score based on how strongly the selected features in the list react to the state change; and
multiplying the meaningfulness score by the change score.

3. The computer-implemented method of claim 2, wherein determining the selection quality score further comprises:
multiplying the meaningfulness score by the change score to obtain a result; and
multiplying the result by a regularization score.

4. The computer-implemented method of claim 2, wherein the meaningfulness score of the selected features is reflected in a token distributional change before and after selection of the selected features.

5. The computer-implemented method of claim 2, wherein the meaningfulness score represents how often a feature is faced with a change.

6. The computer-implemented method of claim 1, further comprising:
performing an optimization process with respect to the selection quality score.

7. The computer-implemented method of claim 6, wherein performing the optimization process with respect to the selection quality score comprises:
adding and removing features to and from the set of features; and
re-determining the selection quality score.

8. The computer-implemented method of claim 6, wherein performing the optimization process with respect to the selection quality score comprises using one or more heuristic models.

9. The computer-implemented method of claim 1, further comprising:
evaluating the data with a delta-average based model comprises disregarding a predetermined amount of the values for each feature of the plurality of features within (i) the first window and (ii) the second window.

10. One or more non-transitory computer-readable media storing computer-executable instructions that, when executed by one or more processors, cause the one or more processors to perform actions comprising:
based at least in part on a state change at a networking component, obtaining data related to values of a plurality of features of the networking component, the data being within a primary window during which the state change occurred;
evaluating the data with respect to changes in the values, wherein evaluating the data comprises:
evaluating the data using a delta-average based model, the delta-average based model evaluating the data within (i) a first window of the primary window, the first window including first data of the data prior to occurrence of the state change and (ii) a second window of the primary window, the second window including second data of the data after the occurrence of the state change; and
based at least in part on the evaluating the data with the delta-average based model, determining a change in mean values of the values for each feature of the plurality of features between the first window and the second window;
based at least in part on the evaluating the data, determining a list of the plurality of features having largest changes in values, wherein the list represents selected features that are most likely contributors to the state change of the networking component;
determining a selection quality score for a set of features within the list, wherein determining the list of the plurality of features having largest changes in values comprises based at least in part on the determining the change in mean values of the values for each feature of the plurality of features between the first window and the second window, determining the list of the plurality of features having largest changes in mean values between the first window and the second window; and
providing the set of features to a user.

11. The one or more non-transitory computer-readable media of claim 10, wherein determining the selection quality score comprises:
determining a meaningfulness score of the selected features in the list;

determining a change score based on how strongly the selected features in the list react to the state change; and multiplying the meaningfulness score by the change score.

12. The one or more non-transitory computer-readable media of claim 11, wherein determining the selection quality score further comprises:

multiplying the meaningfulness score by the change score to obtain a result; and multiplying the result by a regularization score.

13. The one or more non-transitory computer-readable media of claim 11, wherein the meaningfulness score of the selected features is reflected in a token distributional change before and after selection of the selected features.

14. The one or more non-transitory computer-readable media of claim 11, wherein the meaningfulness score represents how often a feature is faced with a change.

15. The one or more non-transitory computer-readable media of claim 10, wherein the actions further comprise:

performing an optimization process with respect to the selection quality score.

16. The one or more non-transitory computer-readable media of claim 15, wherein performing the optimization process with respect to the selection quality score comprises:

adding and removing features to and from the set of features; and re-determining the selection quality score.

17. The one or more non-transitory computer-readable media of claim 15, wherein performing the optimization process with respect to the selection quality score comprises using one or more heuristic models.

18. The one or more non-transitory computer-readable media of claim 10, wherein:

evaluating the data using a delta-average based model further comprises disregarding a predetermined amount of the values for each feature of the plurality of features within (i) the first window and (ii) the second window.

19. A computer-implemented method comprising:

based at least in part on a state change at a networking component, obtaining data related to values of a plurality of features of the networking component, the data being within a window during which the state change occurred;

evaluating the data with respect to changes in the values, wherein evaluating the data comprises:

evaluating the data using a delta-average based model, the delta-average based model evaluating the data within (i) a first window of the primary window, the first window including first data of the data prior to occurrence of the state change and (ii) a second window of the primary window, the second window including second data of the data after the occurrence of the state change; and based at least in part on the evaluating the data with the delta-average based model, determining a change in mean values of the values for each feature of the plurality of features between the first window and the second window;

based at least in part on the evaluating the data, determining a list of the plurality of features having largest changes in values, wherein the list represents selected features that are most likely contributors to the state change of the networking component;

determining a selection quality score for a set of features within the list, wherein determining the selection quality score comprises:

determining a meaningfulness score of the selected features in the list, wherein the meaningfulness score represents one of (i) a rareness of the selected features in the list or (ii) how often a feature of the selected features in the list is faced with a change;

determining a change score based on how strongly the selected features in the list react to the state change; and multiplying the meaningfulness score by the change score; and providing the set of features to a user.

20. The computer-implemented method of claim 19, wherein determining the selection quality score further comprises:

multiplying the meaningfulness score by the change score to obtain a result; and multiplying the result by a regularization score.

* * * * *